United States Patent
Yoo et al.

(10) Patent No.: US 6,240,729 B1
(45) Date of Patent: Jun. 5, 2001

(54) CONVERTING THERMAL ENERGY TO MECHANICAL MOTION

(75) Inventors: Woo Sik Yoo, Palo Alto; Taro Yamazaki, San Jose, both of CA (US)

(73) Assignee: WaferMasters Incorporated, San Jose, CA (US)

( * ) Notice: Subject to any disclaimer, the term of this patent is extended or adjusted under 35 U.S.C. 154(b) by 0 days.

(21) Appl. No.: 09/541,828

(22) Filed: Apr. 3, 2000

(51) Int. Cl.⁷ .................................................. F01K 27/00
(52) U.S. Cl. .............................................. 60/641.1; 60/675
(58) Field of Search ................................ 60/691.1, 620, 60/675

(56) References Cited

U.S. PATENT DOCUMENTS

| | | | |
|---|---|---|---|
| 3,509,716 | 5/1970 | Avery | 60/10 |
| 3,785,144 | 1/1974 | Fairbanks | 60/531 |
| 3,983,704 | 10/1976 | McFarland | 60/641 |
| 4,074,534 * | 2/1978 | Morgan | 60/675 |
| 4,143,517 | 3/1979 | Compton | 60/675 |
| 4,145,890 | 3/1979 | Cruz | 60/675 |
| 4,195,486 | 4/1980 | Rivera-Cruz | 60/675 |
| 4,311,015 | 1/1982 | Rust | 60/675 |
| 4,333,314 | 6/1982 | Allen | 60/675 |
| 4,509,329 | 4/1985 | Breston | 60/531 |
| 4,570,444 * | 2/1986 | Gould | 60/675 |

FOREIGN PATENT DOCUMENTS

534954 * 10/1931 (DE) ...................................... 60/675

* cited by examiner

*Primary Examiner*—Hoang Nguyen
(74) *Attorney, Agent, or Firm*—Skjerven Morrill MacPherson LLP; Theodore P. Lopez

(57) ABSTRACT

An apparatus for converting thermal energy to mechanical motion including a frame mounted onto an axle above a heat source. A flow circuit including at least three elongate chambers connected by fluid conduits is mounted onto the frame, and one-way valves provided in the flow circuit permit one-way fluid flow within the flow circuit. The heat source heats a motive fluid contained within the chambers beyond its boiling point, which increases the vapor pressure within the heated chamber, thereby forcing fluid out of the chamber and into the chamber immediately downstream in the flow circuit. The increased weight of the downstream chamber creates a torque about the axle, rotating the frame in an upstream direction.

20 Claims, 4 Drawing Sheets

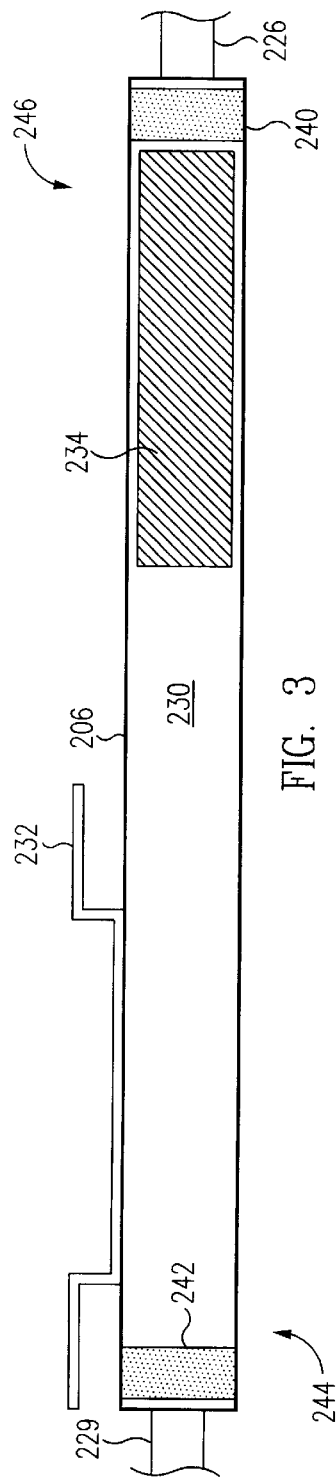
FIG. 3
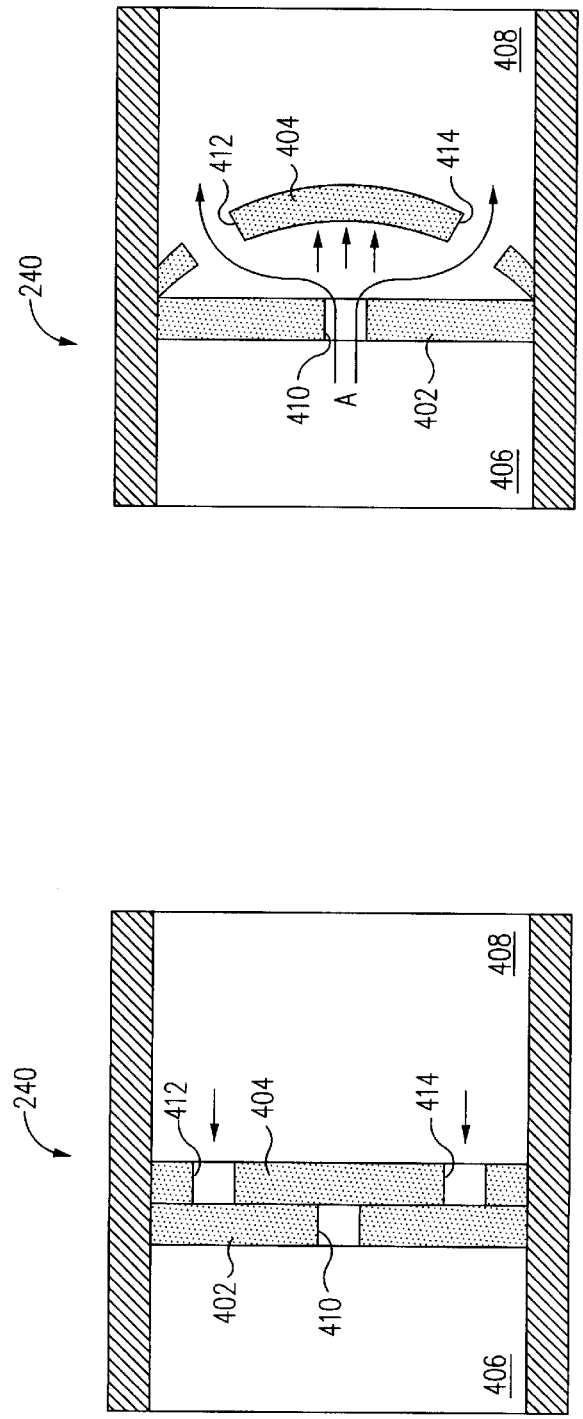
FIG. 4A
FIG. 4B

CONVERTING THERMAL ENERGY TO MECHANICAL MOTION

BACKGROUND

1. Field of the Invention

This invention relates to the conversion of thermal energy to mechanical motion. More specifically, this invention relates to a method and apparatus which utilizes a temperature differential to effectuate rotational movement.

2. Description of Related Art

It has been known to create devices which utilize a temperature differential to create mechanical motion. Some of these devices have been referred to as "heat engines" or "thermal engines," and an exemplary thermal engine 100 is illustrated in FIG. 1. Thermal engine 100 includes four tanks 102–105 mounted on a rotating frame 106, which rotates about an axis 108. As frame 106 rotates, each of the tanks 102–105 is sequentially immersed in fluid heat source 116.

In FIG. 1, tank 102 is fully immersed in fluid heat source 116, which heats a liquid contained within tank 102 beyond its boiling point. The liquid then vaporizes, increasing the pressure within tank 102, and causing the steam to travel up conduit 110 to tank 104, provided on an opposite side of frame 106. Because tank 104 is not immersed in fluid heat source 1 16, its temperature is less than that of tank 102, which causes the vapor passed from tank 102 to tank 104 to condense. The condensed liquid in tank 104 adds weight to tank 104, whose offset center of gravity 114 creates an imbalance which causes counter-clockwise rotation of frame 106. This rotation immerses tank 105 in fluid heat source 116, thereby heating the volatile liquid contained within tank 105 and causing it to vaporize. This vapor travels through conduit 112 to tank 103, where it cools and condenses back into liquid form. In some cases, a cooling source, such as a cool water spray 118, is used to cool tank 114 to assist in the condensation of the vapor. So long as a sufficient temperature differential is maintained between fluid heat source 116 and the apex of rotation, thermal engine 100 is designed to continue rotating.

SUMMARY

In accordance with an embodiment of the present invention, an apparatus for converting thermal energy to mechanical motion is provided, comprising a support, an axle rotatably mounted onto said support, a first frame mounted on said axle for rotation about an axis of rotation perpendicular to a gravitational direction, and a heat source located below said axis of rotation. The apparatus further includes a first flow circuit, comprising at least three chambers mounted on said first frame at angularly equidistant locations, a first plurality of conduits, each conduit connecting one of said at least three chambers in said first flow circuit with a downstream one of said three chambers in said first flow circuit to provide one-way fluid communication between all of said at least three chambers in said first flow circuit, and a motive fluid provided in said at least three chambers in said first flow circuit, said motive fluid having a boiling point lower than a temperature of said heat source such that when one of said at least three chambers in said first flow circuit is in a lowered position, said heat source vaporizes said motive fluid contained in said lowered chamber.

BRIEF DESCRIPTION OF THE DRAWINGS

FIG. 3 shows an exemplary chamber in accordance with an embodiment of the present invention.

FIGS. 4A–4B show an enlarged view of a one-way valve in accordance with an embodiment of the present invention.

Use of the same reference symbols in different figures indicates similar or identical items.

DETAILED DESCRIPTION OF THE PREFERRED EMBODIMENTS

Figure 2:
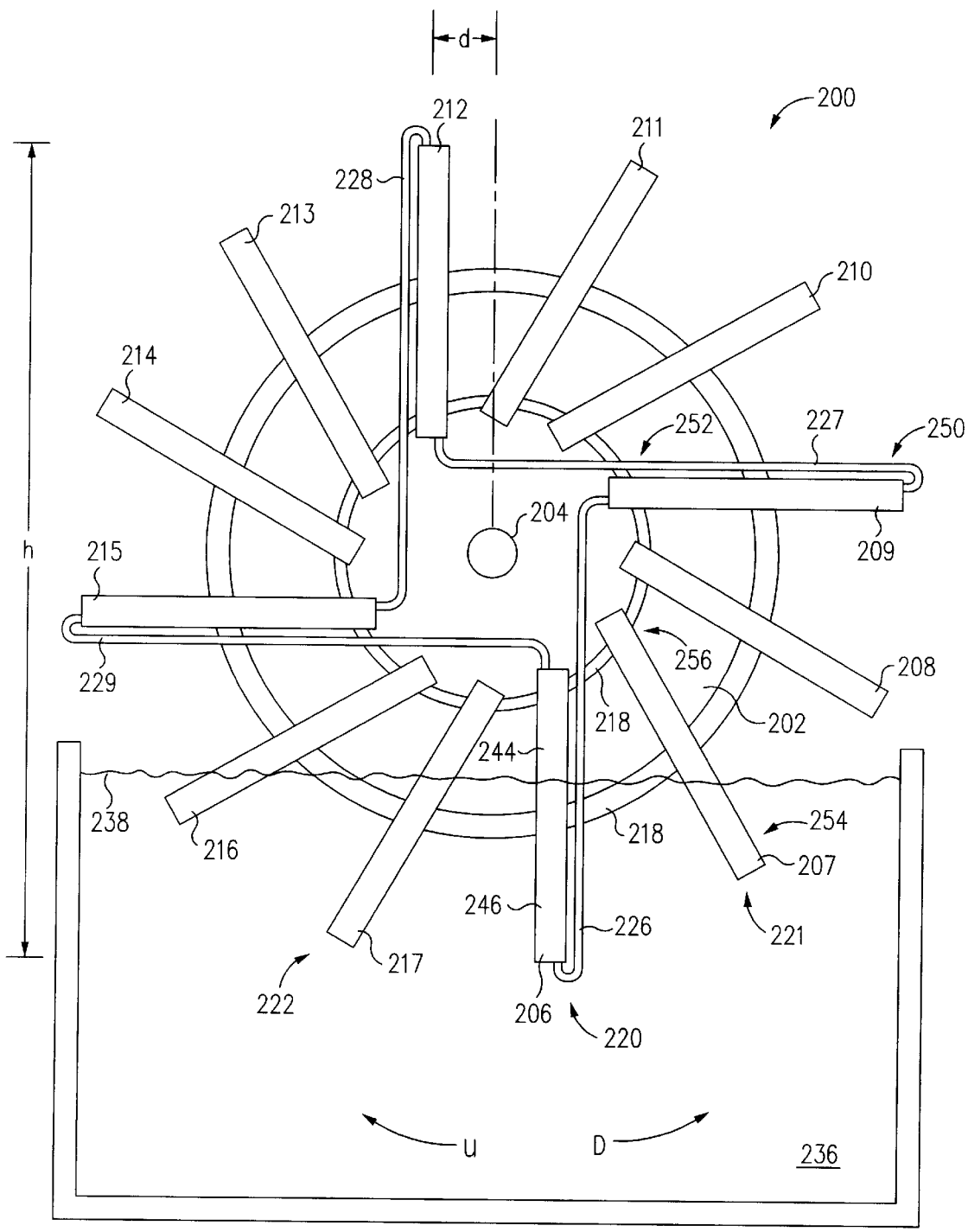
FIG. 2 shows a thermal energy converting apparatus in accordance with an embodiment of the present invention.

FIG. 2 shows an embodiment of a thermal engine apparatus 200 having a first frame 202 mounted onto axle 204 for rotation about an axis of rotation defined by axle 204. A plurality of chambers 206–217 are mounted onto rails 218 on frame 202. In the embodiment shown in FIG. 2, chambers 206–217 form three flow circuits. First flow circuit 220 includes chambers 206, 209, 212, 215, and the conduits 226–229 which connect chambers 206, 209, 212, 215. Chambers 206, 209, 212, 215 are mounted onto frame 202 at angularly equidistant locations around frame 202. Accordingly, chamber 206 is separated from downstream chamber 209 by approximately 90°. The downstream direction is shown in FIG. 2 by arrow D, and indicates the direction in which the motive fluid flows as it passes from chamber to chamber in each flow circuit. The upstream direction is shown by arrow U, and indicates the direction in which frame 202 rotates during operation.

Second flow circuit 221 is formed by chambers 207, 210, 213, 216 and the conduits which connect chambers 207, 210, 213, 216, and third flow circuit 222 is formed by chambers 208, 211, 214, 217 and their connecting conduits. For clarity, the conduits in second and third flow circuits 221–222 are not shown, but would be substantially the same as conduits 226–229 in first flow circuit 220. All of the chambers 206–217 are mounted onto first frame 202 in an offset "fanned" alignment. In other words, if radii are drawn outwards from the axis of rotation, each chamber 206–217 is mounted parallel to a radius line, but offset by a distance d. The height h of the rotating portion of the thermal engine 200 can vary, but in one embodiment is approximately 1.8 m. In this embodiment, the offset distance d is approximately 100–200 mm.

A heat source 236 is provided below the axis of rotation of frame 202. In one embodiment, heat source 236 is a reservoir containing heated water obtained from a natural hot spring. Alternatively, heat source 236 can be a liquid heated using, for example, solar energy, wood, coal, or other fossil fuels, or can be an electrical filament heater.

FIG. 3 shows chamber 206 in greater detail. Chamber 206 has an elongate, cylindrical outer housing and a hollow interior region 230, which contains a motive fluid, such as ethyl alcohol, acetone, diethyl ether, methylene chloride, or butane. One-way outlet valve 240 leads to conduit 226, which provides fluid communication from chamber 206 to downstream chamber 209. One-way inlet valve 242 connects conduit 229 to chamber 206, providing fluid communication from upstream chamber 215 to chamber 206. Bracket 232 is used to mount chamber 206 to rails 218 on first frame 202.

A metallic heat transfer material 234 may be provided in all or a portion of interior region 230 to effectuate rapid transfer of heat from heat source 236 to the motive fluid contained within chamber 206, as will be described below. The heat transfer material 234 may be, for example, steel wool or metal fins projecting into chamber 206. The heat transfer material 234 is optimally one that does not react or corrode due to immersion in the motive fluid.

Outlet valve 240 is shown in greater detail in FIGS. 4A–4B. Inner wall 402 having a central hole 410 is provided on an internal side 406 of valve 240. Outer wall 404 having peripheral holes 412, 414 is provided on an external side 408 of valve 240. In one embodiment, inner wall 402 is made of a relatively rigid material which is substantially non-reactive with the motive fluid contained within chamber 206, and outer wall 404 is made of a non-reactive, yet compliant material, such as silicone rubber. In another embodiment, both inner wall 402 and outer wall 404 are made of the same compliant material.

When the pressure on external side 408 is greater than the pressure on internal side 406, as shown in FIG. 4A, the gas or fluid on external side 408 pass through holes 412, 414, and apply a pressure on inner wall 402. Because inner wall 402 is sufficiently rigid (due to the rigid material forming inner wall 402 or, alternatively, due to the positioning of holes 412, 414 along the outer edges of an elastic inner wall 402), it effectively blocks holes 412, 414, preventing fluid flow into internal side 406 of chamber 206. When the pressure on internal side 406 is greater than the pressure on external side 408, the fluid or gas applies a force to the center of flexible outer wall 404, deforming it into the curved shape shown in FIG. 4B. This deformation opens a path, marked by arrows A, through which the fluid can pass. Thus, outlet valve 240 allows only one-way flow out of chamber 206. Inlet valve 242 operates under the same principle as outlet valve 240, but permits only one-way fluid flow into chamber 206.

The operation of thermal engine apparatus 200 is as follows. In FIG. 2, chamber 206 is shown as being in a lowered position such that it is vertically-oriented and partially immersed in heat source 236. In this lowered position, more than half of chamber 206 is below water line 238. The heat from heat source 236 passes to chamber 206, which then heats the motive fluid contained therein. Because of the excellent thermal conductivity of metal, metallic heat transfer material 234 facilitates the transfer of heat from the exterior surface of chamber 206 to the fluid in interior 230 by increasing the fluid-metal contact surface area.

The motive fluid, which has a boiling point less than or equal to the temperature of heat source 236, is heated to its boiling point and begins to vaporize. At this lowered position, the motive fluid contained in vertically-oriented chamber 206 is drawn downwards by gravity to the portion of chamber 206 furthest from the axis of rotation, distal end 246. As the motive fluid vaporizes, the vaporized gas bubbles move upward to proximal end 244, the end closest to the axis of rotation. Because one-way inlet valve 242 (FIG. 3) only allows one-way flow into chamber 206, the vapor cannot escape from proximal end 244, causing pressure to build within interior portion 230 of chamber 206. This pressure forces the fluid collected at the distal end 246 of chamber 206 to flow out of outlet valve 240, through conduit 226, and into chamber 209, which is the chamber immediately downstream of chamber 206 in first flow circuit 220.

Chamber 209 is substantially identical to chamber 206, but when chamber 206 is at the lowered position, as shown in FIG. 2, chamber 209 is at an angular location approximately 90° from chamber 206. At this position, chamber 209 extends laterally outwardly from the axis of rotation. As fluid from chamber 206 passes through chamber 209's inlet valve and begins to fill the interior of chamber 209, the increased weight of chamber 209 creates a torque about axle 204. This torque causes frame 202 to rotate in a clockwise direction. As chamber 209 begins to move, its distal end 250 dips below its proximal end 252. This causes the fluid within chamber 209 to gather in the distal end 250, thereby moving the center of gravity for chamber 209 radially outwards. This increases the torque on frame 202, and further drives the clockwise rotation of frame 202.

When chamber 209 is substantially perpendicular to the direction of gravity and begins to fill with motive fluid from chamber 206, the offset distance d provides an increase in the potential energy of chamber 209 by raising it above the level at which it would be located if it were positioned along a radial line with no offset.

As frame 202 rotates, chamber 207 is drawn deeper into heat source 236 and eventually replaces chamber 206 at its former lowered position. Because chamber 206 is mounted onto frame 202 in an offset fashion, chamber 206 passes through a fully upright position, as shown in FIG. 2, before passing directly beneath the axis of rotation. Thus, as frame 202 rotates to a position where the proximal end 244 of chamber 206 is directly beneath the axis of rotation 204, the distal end 246 of chamber 206 remains fully immersed in heat source 236. In FIG. 2, this position is shown by chamber 217. The increased time that chamber 206 is immersed in heat source 236 as a result of the offset placement of Chamber 206 improves the heat flow into chamber 206 and increases the transfer efficiency of the apparatus 200.

While the fluid is circulating in first flow circuit 220 from chamber 206 to chamber 209, causing rotation of frame 202, second flow circuit 221 experiences a similar fluid flow. With the rotation of frame 202, chamber 207 becomes more deeply immersed into heat source 236, and the motive fluid contained within distal end 254 of chamber 207 is heated to its boiling point. The vaporized fluid increases the pressure within chamber 207, forcing fluid out of chamber 207 and into chamber 210, which is the chamber immediately downstream of chamber 207 in second flow circuit 221. The increased weight added to chamber 210 further increases the torque on frame 202, thereby driving continued rotation of frame 202.

Figure 1:
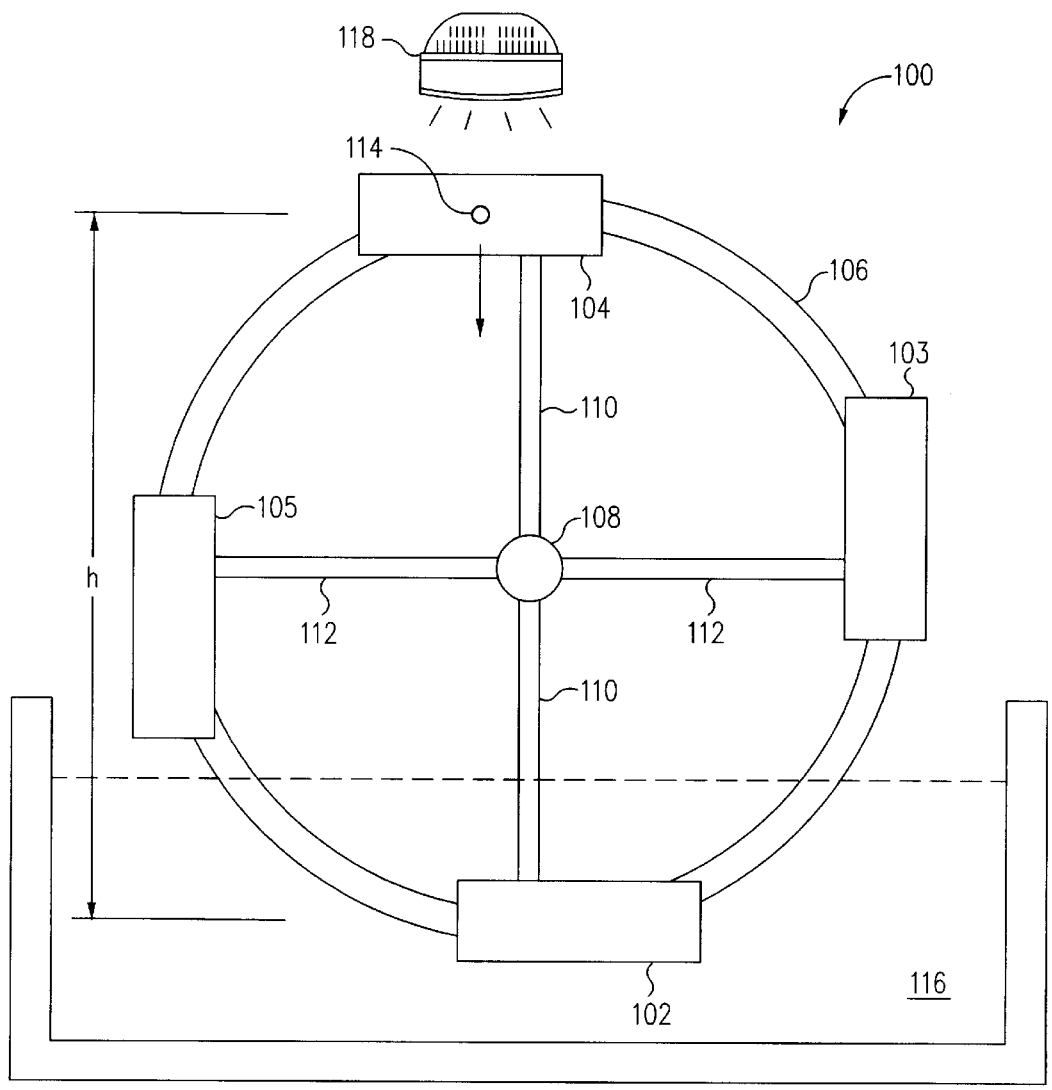
FIG. 1 shows a prior art thermal engine.

The apparatus described above provides several advantages over thermal engine 100 illustrated in FIG. 1. First, the mounting of at least three chambers onto a frame at angularly equidistant locations facilitates improved fluid transfer from one chamber to the next. In FIG. 1, the pressure within chamber 102 must be sufficient to force fluid or gas in a vertical direction for the entire length of conduit 110, (distance h) which is equal to the diameter of the circular path of rotation traveled by chambers 102–105. Chamber 102 must therefore generate an extremely large internal pressure in order to drive the vertical movement of such a long column of water. According to the above-described embodiment of the present invention, chamber 209 is only separated from chamber 206 by an angular displacement of approximately 90°. Thus, the vertical distance which must be covered by the motive fluid in order to travel from chamber 206 to chamber 209 is approximately one half of h. Accordingly, the pressure that must be generated by chamber 206 is order to drive the fluid flow from chamber 206 to chamber 209 is significantly decreased.

In addition, because chamber 104 is separated from chamber 102 by approximately 180°, when chamber 102 is at the lowered position shown in FIG. 1, the center of gravity of chamber 104 is directly above or only slightly offset from the axis of rotation. This produces a very small torque to drive the rotation of engine 100. In apparatus 200, when chamber 206 is in the lowered, vertically-oriented position, the center of gravity of chamber 209 is much farther from the axis of rotation, which creates a large torque. The location of the center of gravity for chamber 209 also assures rotation in the upstream, clockwise direction. In FIG. 1, because the offset of tank 104 is small, a slight imbalance within the tanks 102–105 could result in an undesirable backwards rotation.

The above-described embodiment of the present invention provides an additional advantage over the system shown in FIG. 1 because each flow circuit contains four individual chambers connected for one-way fluid flow. In FIG. 1, tank 102 is only connected with tank 104, so when the motive fluid within tank 102 boils and begins to travel up conduit 110, this fluid flow is opposed by the pressure within tank 104 and can only occur when tank 104 has cooled sufficiently such that its internal pressure is significantly lower than that of tank 102. In contrast, chamber 206 is connected with chambers 209, 212, and 215, so that if the pressure within chamber 209 increases to a level which would prevent the fluid flow from chamber 206, some of the motive fluid within chamber 209 would travel downstream through conduit 227 to chamber 212, thereby decreasing the pressure within chamber 209 and enabling continued fluid flow from chamber 206.

Figure 5:
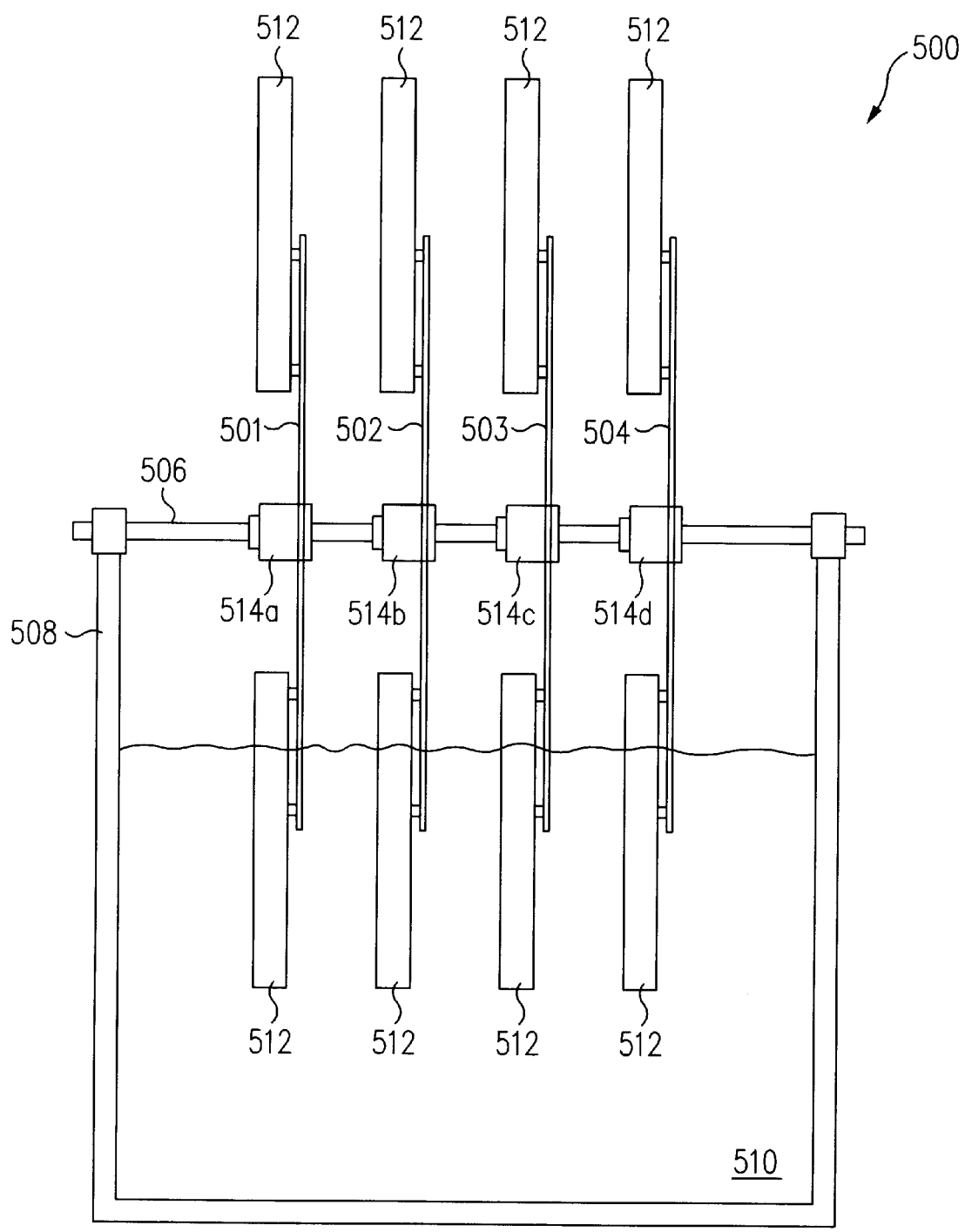
FIG. 5 shows a thermal energy converting apparatus having a plurality of frames in accordance with another embodiment of the present invention.

In another aspect of the present invention illustrated in FIG. 5, multiple frames 501–504 are mounted onto axle 506, each frame being similar to frame 202 in FIG. 2. Axle 506 is rotatably mounted onto support 508 above heat source 510. A plurality of chambers 512, similar to chamber 206, are mounted onto frames 501–504 such that they trace a path of rotation which passes through heat source 510. The operation of frames 501–504 is similar to that described above with respect to apparatus 200, except that there is a plurality of frames 501–504 mounted to a single axle 506.

Each frame 501–504 is mounted onto axle 506 using one-way bearings 514. Bearings 514 are similar to those used on the rear hub of a conventional bicycle, and are used to pass the torque generated by the rotation of frames 501–504 onto axle 506 in the upstream direction only. Thus, bearings 514 allow the frame to rotate freely with respect to axle 506 in the downstream direction. For example, when the fluid flow in frame 501 is generating an upstream rotation of axle 506, but frame 502 is not experiencing a similar rotation, bearing 514a drives the upstream rotation of axle 506, while bearing 514b allows frame 502 to remain stationary. This ensures that axle 506 is driven only in the upstream direction by frames 501–504, and that each of the frames does not interfere with the rotation generated by the other frames by increasing the moment of inertia of the apparatus 500.

In embodiments where hot spring water is used as heat source 236, the water can be constantly replenished as the temperature of heat source 236 decreases. The hot spring water advantageously provides an inexpensive and constant source for thermal energy. In addition, it is also advantageous to utilize embodiments of this invention in locations where the ambient temperature is extremely cold, but which have an ample supply of hot spring water. Such locations are well known in, for example, Korea and northern portions of Japan.

Although the invention has been described with reference to particular embodiments, the description is only an example of the invention's application and should not be taken as a limitation. In particular, even though much of the preceding discussion was directed to cylindrical chambers, alternative embodiments of this invention may use chambers of varying shapes. In addition, while apparatus 200 included three separate flow circuits 220, 221, 222, alternative embodiments include fewer or greater members of flow circuits. Various other adaptations and combinations of features of the embodiments disclosed are within the scope of the invention as defined by the following claims.

I claim:

1. An apparatus for converting thermal energy to mechanical motion, comprising:
   a first frame mounted on an axle for rotation about an axis of rotation substantially perpendicular to a gravitational direction;
   a heat source located below said axis of rotation; and
   a first flow circuit, including:
   at least three elongate chambers mounted on said first frame at angularly equidistant locations;
   a first plurality of conduits, each conduit connecting one of said at least three chambers in said first flow circuit with a downstream one of said three chambers in said first flow circuit to provide one-way fluid communication between all of said at least three chambers in said first flow circuit, each of said at least three chambers including:
   an outlet valve in fluid communication with said conduit connected to said downstream one of said at least three chambers, and
   an inlet valve in fluid communication with a conduit connected to the outlet valve on an upstream one of said at least three chambers; and
   a motive fluid provided in said at least three chambers in said first flow circuit, said motive fluid having a boiling point lower than a temperature of said heat source such that when one of said at least three chambers in said first flow circuit is in a lowered position, said heat source vaporizes said motive fluid contained in said lowered chamber increasing vapor pressure within said lowered chamber forcing motive fluid out of said outlet valve and into said downstream one of said at least three chambers.

2. The apparatus of claim 1, wherein said at least three chambers comprises four chambers.

3. The apparatus of claim 1, wherein said first frame is mounted on said axle using a bearing which permits torque generated by rotation of said first frame to be transferred to said axle in an upstream direction only.

4. The apparatus of claim 1, wherein:
   said heat source is a volume of liquid having a temperature greater than an ambient temperature; and
   wherein as said first frame is rotated about said axis of rotation, each of said at least three chambers in said first flow circuit passes through said volume of liquid.

5. The apparatus of claim 1, wherein said motive fluid has a boiling point less than the boiling point of water at atmospheric pressure.

6. The apparatus of claim 1, wherein said motive fluid is taken from the group consisting of ethyl alcohol, acetone, diethyl ether, methylene chloride, and butane.

7. The apparatus of claim 1, wherein each of said at least three chambers further comprises a metallic heat transfer material.

8. The apparatus of claim 1, further comprising a second flow circuit, including:

a at least three chambers mounted on said first frame at angularly equidistant locations;

a second plurality of conduits, each conduit connecting one of said at least three chambers in said second flow circuit with a downstream one of said three chambers in said second flow circuit to provide one-way fluid communication between all of said at least three chambers in said second flow circuit; and a motive fluid provided in said second flow circuit, said motive fluid having a boiling point lower than a temperature of said heat source such that when one of said at least three chambers in said second flow circuit is in a lowered position, said heat source vaporizes said motive fluid contained in said lowered chamber.

9. The apparatus of claim 1, further comprising:

a second frame rotatably mounted on said axle for rotation about said axis of rotation; and a third flow circuit, including:

at least three chambers mounted on said second frame at angularly equidistant locations;

a third plurality of conduits, each conduit connecting one of said at least three chambers in said third flow circuit with a downstream one of said three chambers in said third flow circuit to provide one-way fluid communication between all of said at least three chambers in said third flow circuit; and a motive fluid provided in said third flow circuit, said motive fluid having a boiling point lower than a temperature of said heat source such that when one of said at least three chambers in said third flow circuit is in a lowered position, said heat source vaporizes said motive fluid contained in said lowered chamber.

10. The apparatus of claim 9, wherein said first frame and said second frame are rotatably mounted on said axle using bearings which permit torque generated by rotation of said first frame and said second frame to be transferred to said axle in an upstream direction only.

11. An apparatus for converting thermal energy to mechanical motion, comprising:

a first frame rotatably mounted on an axle for rotation about an axis of rotation perpendicular to a gravitational direction;

a heat source located below said axis of rotation;

a first flow circuit, including:

a first elongate chamber having a central axis perpendicular to said axis of rotation, an end distal from said axis of rotation, and an end proximate to said axis of rotation, said first chamber being mounted on said first frame;

a second elongate chamber having a central axis perpendicular to said axis of rotation, an end distal from said axis of rotation, and an end proximate to said axis of rotation, said second chamber being mounted on said first frame at a rotational location approximately 90° from said first chamber in a downstream direction;

a first conduit in fluid communication with said first chamber and said second chamber;

a third elongate chamber having a central axis perpendicular to said axis of rotation, an end distal from said axis of rotation, and an end proximate to said axis of rotation, said third chamber being mounted on said first frame at a rotational location approximately 90° from said second chamber in a downstream direction;

a second conduit in fluid communication with said second chamber and said third chamber;

a fourth elongate chamber having a central axis perpendicular to said axis of rotation, an end distal from said axis of rotation, and an end proximate to said axis of rotation, said fourth chamber being mounted on said first frame at a rotational location approximately 90° from said third chamber in a downstream direction;

a third conduit in fluid communication with said third chamber and said fourth chamber;

a fourth conduit in fluid communication with said fourth chamber and said first chamber; and a motive fluid contained in said first flow circuit.

12. An apparatus for converting thermal energy to mechanical motion, comprising:

a support;

an axle rotatably mounted on said support;

a first frame rotatably mounted on said axle for rotation about an axis of rotation perpendicular to a gravitational direction;

a heat source located below said axis of rotation;

a first flow circuit, comprising:

a first elongate chamber having a central axis perpendicular to said axis of rotation, an end distal from said axis of rotation, and an end proximate to said axis of rotation, said first chamber being mounted on said first frame;

a second elongate chamber having a central axis perpendicular to said axis of rotation, an end distal from said axis of rotation, and an end proximate to said axis of rotation, said second chamber being mounted on said first frame at a rotational location approximately 45° from said first chamber in a downstream direction;

a first conduit in fluid communication with said first chamber and said second chamber;

a third elongate chamber having a central axis perpendicular to said axis of rotation, an end distal from said axis of rotation, and an end proximate to said axis of rotation, said third chamber being mounted on said first frame at a rotational location approximately 45° from said second chamber in a downstream direction;

a second conduit in fluid communication with said second chamber and said third chamber;

a fourth elongate chamber having a central axis perpendicular to said axis of rotation, an end distal from said axis of rotation, and an end proximate to said axis of rotation, said fourth chamber being mounted on said first frame at a rotational location approximately 45° from said third chamber in a downstream direction;

a third conduit in fluid communication with said third chamber and said fourth chamber;

a fourth conduit in fluid communication with said fourth chamber and said first chamber;

a first chamber outlet valve provided at said distal end of said first chamber, said first chamber outlet valve permitting fluid flow from said first chamber through said first conduit to said second chamber;

a second chamber outlet valve provided at said distal end of said second chamber, said second chamber outlet valve permitting fluid flow from said second chamber through said second conduit to said third chamber;

a third chamber outlet valve provided at said distal end of said third chamber, said third chamber outlet valve permitting fluid flow from said third chamber through said third conduit to said fourth chamber; and a fourth chamber outlet valve provided at said distal end of said fourth chamber, said fourth chamber outlet valve permitting fluid flow from said fourth chamber through said fourth conduit to said first chamber; and a motive fluid contained in said first flow circuit.

13. The apparatus of claim 11, wherein said motive fluid has a boiling point lower than a temperature of said heat source.

14. The apparatus of claim 11, wherein said heat source is a volume of liquid having a temperature greater than an ambient temperature; and wherein as said first frame is rotated about said axis of rotation, each of said elongate chambers in said first flow circuit passes through said volume of liquid.

15. The apparatus of claim 11, wherein said motive fluid has a boiling point less than the boiling point of water at atmospheric pressure.

16. The apparatus of claim 11, wherein said motive fluid is taken from the group consisting of ethyl alcohol, acetone, diethyl ether, methylene chloride, and butane.

17. The apparatus of claim 11, wherein each of said elongate chambers further comprises a metallic heat transfer material.

18. The apparatus of claim 11, further comprising a second flow circuit, including:

at least four elongate chambers mounted on said first frame at angularly equidistant locations;

a second plurality of conduits, each conduit connecting one of said at least four elongate chambers in said second flow circuit with a downstream one of said four elongate chambers in said second flow circuit to provide one-way fluid communication between all of said at least four elongate chambers in said second flow circuit; and a motive fluid provided in said second flow circuit, said motive fluid having a boiling point lower than a temperature of said heat source such that when one of said at least four elongate chambers in said second flow circuit is in a lowered position, said heat source vaporizes said motive fluid contained in said lowered chamber.

19. The apparatus of claim 11, further comprising:

a second frame rotatably mounted on said axle for rotation about said axis of rotation; and a third flow circuit, including:

at least four elongate chambers mounted on said second frame at angularly equidistant locations;

a third plurality of conduits, each conduit connecting one of said at least four elongate chambers in said third flow circuit with a downstream one of said four elongate chambers in said third flow circuit to provide one-way fluid communication between all of said at least four elongate chambers in said third flow circuit; and a motive fluid provided in said third flow circuit, said motive fluid having a boiling point lower than a temperature of said heat source such that when one of said at least four chambers in said third flow circuit is in a lowered position, said heat source vaporizes said motive fluid contained in said lowered chamber.

20. The apparatus of claim 11, wherein said first flow circuit further comprises:

a first chamber outlet valve provided at said distal end of said first chamber, said first chamber outlet valve permitting fluid flow from said first chamber through said first conduit to said second chamber;

a second chamber outlet valve provided at said distal end of said second chamber, said second chamber outlet valve permitting fluid flow from said second chamber through said second conduit to said third chamber;

a third chamber outlet valve provided at said distal end of said third chamber, said third chamber outlet valve permitting fluid flow from said third chamber through said third conduit to said fourth chamber; and a fourth chamber outlet valve provided at said distal end of said fourth chamber, said fourth chamber outlet valve permitting fluid flow from said fourth chamber through said fourth conduit to said first chamber.

* * * * *